US012715784B2

(12) United States Patent
Takiguchi Takemoto et al.

(10) Patent No.: US 12,715,784 B2
(45) Date of Patent: Aug. 25, 2026

(54) METHOD FOR PRODUCING POSITIVE ELECTRODE ACTIVE MATERIAL

(71) Applicants: SUMITOMO CHEMICAL COMPANY, LIMITED, Tokyo (JP); Kyoto University, Kyoto (JP)

(72) Inventors: Marie Takiguchi Takemoto, Osaka (JP); Satoshi Shimano, Kyoto (JP)

(73) Assignees: Sumitomo Chemical Co., Ltd., Tokyo (JP); Kyoto University, Kyoto (JP)

( * ) Notice: Subject to any disclaimer, the term of this patent is extended or adjusted under 35 U.S.C. 154(b) by 16 days.

(21) Appl. No.: 19/105,725

(22) PCT Filed: Aug. 29, 2023

(86) PCT No.: PCT/JP2023/031248

§ 371 (c)(1),
(2) Date: Feb. 21, 2025

(87) PCT Pub. No.: WO2024/048590

PCT Pub. Date: Mar. 7, 2024

(65) Prior Publication Data

US 2026/0008695 A1 Jan. 8, 2026

(30) Foreign Application Priority Data

Aug. 31, 2022 (JP) ................................. 2022-137692

(51) Int. Cl.
*H01M 4/505* (2010.01)
*C01G 53/504* (2025.01)
*H01M 4/525* (2010.01)

(52) U.S. Cl.
CPC .......... *C01G 53/504* (2025.01); *H01M 4/505* (2013.01); *H01M 4/525* (2013.01); *C01P 2002/50* (2013.01); *C01P 2006/40* (2013.01)

(58) Field of Classification Search
CPC .... H01M 4/505; H01M 2004/028; B09B 3/40
See application file for complete search history.

(56) References Cited

U.S. PATENT DOCUMENTS

2013/0323142 A1 12/2013 Shimano et al.
2015/0372300 A1 12/2015 Imaizumi et al.
2015/0380740 A1* 12/2015 Black ...................... H01M 4/66 438/666
2020/0119350 A1 4/2020 Nakayama et al.
2023/0094145 A1 3/2023 Shimano
2023/0238598 A1 7/2023 Kim et al.

FOREIGN PATENT DOCUMENTS

JP 2005-353584 A 12/2005
JP 2012-186150 A 9/2012
JP 2015-122234 A 7/2015
JP 2021-140996 A 9/2021
WO 2022/065721 A1 3/2022

OTHER PUBLICATIONS

International Preliminary Report on Patentability issued Mar. 1, 2025 in PCT Application No. PCT/JP2023/031248.

* cited by examiner

*Primary Examiner* — Khanh T Nguyen
(74) *Attorney, Agent, or Firm* — Rimon P.C.

(57) ABSTRACT

A method for producing a positive electrode active material comprising: (1) mixing an activation agent containing one or more types of alkali metal compounds with an electrode material mixture; (2) heating the mixture at a temperature at a melting start temperature of the activation agent or more; (3) bringing the mixture after step (2) into contact with a water-containing liquid to obtain a slurry, and separating the slurry into a solid component and a liquid component; (4) removing water from the solid component by subjecting the solid component to heating and/or a reduced-pressure environment, wherein an ambient pressure at which the solid component exists and/or a temperature thereof is changed so that a ratio of saturated water vapor pressure at the temperature thereof to the ambient pressure becomes 80% or more within 24 hours after slurry separation; and (5) heat-treating the solid component after step (4) at lower than 900° C.

3 Claims, No Drawings

METHOD FOR PRODUCING POSITIVE ELECTRODE ACTIVE MATERIAL

CROSS-REFERENCE TO RELATED APPLICATIONS

This application is the U.S. National Phase under 35 U.S.C. § 371 of International Application No. PCT/JP2023/031248, filed on Aug. 29, 2023, which claims the benefit of foreign priority to Japanese Patent Application No. 2022-137692, filed on Aug. 31, 2022, the entire contents of each of which are hereby incorporated by reference.

TECHNICAL FIELD

The present invention relates to a method for producing a positive electrode active material.

BACKGROUND ART

Rare metal components such as cobalt, nickel, manganese, and lithium are contained in a positive electrode active material of a battery, and particularly, a compound containing the rare metal component as a main component is used in a positive electrode active material of a non-aqueous electrolyte secondary battery. In order to preserve resources of rare metal components, a method for reproducing a rare metal component from a battery waste material of a secondary battery is required.

For example, Patent Literature 1 discloses a method in which an electrode material mixture and an activation agent containing an alkali metal compound are mixed, the mixture is heated to decompose a binder, and a decomposition product and the activation agent are removed with water or the like to recover a positive electrode active material. This method is excellent in terms of cost in that the positive electrode active material is directly recovered from the battery waste material without using an organic solvent.

CITATION LIST

Patent Literature

Patent Literature 1: Japanese Unexamined Patent Application Publication No. 2012-186150

SUMMARY OF INVENTION

Technical Problem

Incidentally, in order to suitably reuse the positive electrode active material after reproduction, it is required to suppress deterioration of the positive electrode active material before and after a reproduction step. When the positive electrode active material is deteriorated, the performance of the battery using the regenerated positive electrode active material, for example, a decrease in charge-discharge capacity and an increase in internal resistance are caused, which is not preferable.

An object of the present invention is to provide a method for producing a positive electrode active material capable of suppressing deterioration of the positive electrode active material.

Solution to Problem

A method according to an aspect is a method for producing a positive electrode active material, including the following steps.

A method for producing a positive electrode active material including the following steps:

(1) mixing an activation agent containing one type or two or more types of alkali metal compounds with an electrode material mixture which contains a positive electrode active material, a binder, and an electrolyte and from which at least a part of the electrolyte has been removed by contact with an electrolyte cleaning solvent to obtain a mixture;

(2) heating the mixture at a retention temperature equal to or higher than a melting start temperature of the activation agent;

(3) bringing the mixture after step (2) into contact with a water-containing liquid to obtain a slurry containing a solid component and a liquid component, and then separating the slurry into a solid component and a liquid component;

(4) removing water from the obtained solid component by subjecting the solid component to heating and/or a reduced-pressure environment, wherein an ambient pressure at which the solid component exists and/or a temperature of the solid component is changed so that a ratio of saturated water vapor pressure at the temperature of the solid component to the ambient pressure becomes 80% or more within 24 hours after the slurry is separated into the solid component and the liquid component; and (5) heat-treating the solid component after step (4) at lower than 900° C.

The positive electrode active material can be a composite oxide containing one or more types of elements selected from the following element group 1 and one or more types of elements selected from the following element group 2:

element group 1: Ni, Co, Mn, Fe, Al, and P; and element group 2: Li, Na, K, Ca, Sr, Ba, and Mg.

The positive electrode active material can be represented by the following formula:

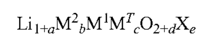

$$Li_{1+a}M^2_bM^1M^T_cO_{2+d}X_e$$

provided that, $M^2$ represents at least one type of element selected from the group consisting of Na, K, Ca, Sr, Ba, and Mg, $M^1$ represents at least one type of element selected from the group consisting of Ni, Co, Mn, Fe, Al, and P, $M^T$ represents at least one type of element selected from the group consisting of transition metal elements except Ni, Co, Mn, and Fe, X represents at least one type of element selected from the group consisting of nonmetallic elements except O and P, and $-0.4<a<1.5$, $0\leq b<0.5$, $0\leq c<0.5$, $-0.5<d<1.5$, and $0\leq e<0.5$ are satisfied.

Advantageous Effects of Invention

The positive electrode active material can be produced from the electrode material mixture while suppressing deterioration of the positive electrode active material.

DESCRIPTION OF EMBODIMENTS (Method for Producing Positive Electrode Active Material)

Hereinafter, a method for producing a positive electrode active material related to recycling will be described.

The method for producing a positive electrode active material according to an embodiment of the present invention includes the following steps of:

(1) mixing an activation agent containing one type or two or more types of alkali metal compounds with an electrode material mixture which contains a positive electrode active material, a binder, and an electrolyte and from which at least a part of the electrolyte has been removed by contact with an electrolyte cleaning solvent to obtain a mixture;

(2) heating the mixture at a retention temperature equal to or higher than a melting start temperature of the activation agent;

(3) bringing the mixture after step (2) into contact with a water-containing liquid to obtain a slurry containing a solid component and a liquid component, and then separating the slurry into a solid component and a liquid component;

(4) removing water from the obtained solid component by subjecting the solid component to heating and/or a reduced-pressure environment, wherein an ambient pressure at which the solid component exists and/or a temperature of the solid component is changed so that a ratio of saturated water vapor pressure at the temperature of the solid component to the ambient pressure becomes 80% or more within 24 hours after the slurry is separated into the solid component and the liquid component; and (5) heat-treating the solid component after step (4) at lower than 900° C.

Hereinafter, each step in the present embodiment will be described in detail.

Step (1): Activation Agent Mixing Step (1) a step of mixing an activation agent containing one type or two or more types of alkali metal compounds with an electrode material mixture which contains a positive electrode active material, a binder, and an electrolyte and from which at least a part of the electrolyte has been removed by contact with an electrolyte cleaning solvent to obtain a mixture;

<Electrode Material Mixture before Contact with Electrolyte Cleaning Solvent>

The electrode material mixture before contact contains a positive electrode active material, a binder, and an electrolyte, and the positive electrode active materials are bonded to each other by the binder. The electrode material mixture may further contain a conductive material, and in this case, the positive electrode active material and the conductive material are bonded to each other by a binding agent. The electrolyte is a component derived from the electrolytic solution of the battery and impregnated into the electrode material mixture.

<Positive Electrode Active Material>

Examples of the positive electrode active material include composite compounds including constituent elements, such as lithium, oxygen, fluorine, sodium, magnesium, aluminum, silicon, phosphorus, sulfur, potassium, calcium, titanium, vanadium, chromium, manganese, iron, cobalt, nickel, copper, zinc, gallium, yttrium, niobium, molybdenum, silver, indium, and tungsten.

Note that the positive electrode active material may be composed of a single compound or plural compounds.

Suitable examples of the positive electrode active material include a composite oxide containing one or more types of elements selected from the following element group 1 and one or more types of elements selected from the following element group 2:

element group 1: Ni, Co, Mn, Fe, Al, and P; and element group 2: Li, Na, K, Ca, Sr, Ba, and Mg.

Among them, the positive electrode active material is preferably represented by the following chemical formula (formula A):

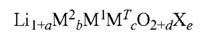

$$Li_{1+a}M^2_bM^1M^T_cO_{2+d}X_e$$

provided that, $M^2$ represents at least one type of element selected from the group consisting of Na, K, Ca, Sr, Ba, and Mg, M1 represents at least one type of element selected from the group consisting of Ni, Co, Mn, Fe, Al, and P, MT represents at least one type of element selected from the group consisting of transition metal elements except Ni, Co, Mn, and Fe, X represents at least one type of element selected from the group consisting of nonmetallic elements except O and P, and $-0.4<a<1.5$, $0\leq b<0.5$, $0\leq c<0.5$, $-0.5<d<1.5$, and $0\leq e<0.5$ are satisfied.

$M^T$ is preferably at least one type of element selected from the group consisting of Cu, Ti, Mg, Al, W, Mo, Nb, Zn, Sn, Zr, Ga, V, B, Si, Ca, Sr, Ba, Ge, Cr, Sc, Y, La, Ta, Tc, Ru, Rh, Pd, Ag, Cd, and In.

The positive electrode active material is preferably a composite oxide containing at least Li and Ni.

Furthermore, in the positive electrode active material, the molar fraction of Ni in $M^1$ is more preferably 0.3 to 0.95.

The crystal structure of the composite oxide as the positive electrode active material is not particularly limited, but a layered structure is preferable, and a hexagonal or a monoclinic crystal structure is more preferable.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3 ml, P31m, P3c1, P31c, R3m, R3c, P-31m, P-31c, P-3 ml, P-3c1, R-3m, R-3c, P6, $P6_1$, $P6_5$, $P6_2$, $P6_4$, $P6_3$, P-6, P6/m, $P6_3/m$, P622, $P6_122$, $P6_522$, $P6_222$, $P6_422$, $P6_322$, P6 mm, P6cc, $P6_3$ cm, $P6_3mc$, P-6m2, P-6c2, P-62m, P-62c, P6/mmm, P6/mcc, $P6_3/mcm$, and $P6_3/mmc$.

The monoclinic crystal structure belongs to any one space group selected from the group consisting of P2, $P2_1$, C2, Pm, Pc, Cm, Cc, P2/m, $P2_1/m$, C2/m, P2/c, $P2_1/c$, and C2/c.

Further, the crystal structure of the composite oxide preferably belongs to a space group of R-3m included in the hexagonal crystal structure or C2/m included in the monoclinic crystal structure.

Note that the crystal structure of the positive electrode active material is identified from an X-ray powder diffraction pattern obtained by X-ray powder diffraction measurement using CuKα radiation as a radiation source.

The particle size of the positive electrode active material in the electrode material mixture is not particularly limited, and is usually about 0.001 to 100 μm. Note that the particle size distribution of the positive electrode active material can be measured using a laser diffraction scattering particle size distribution measuring apparatus (for example, Mastersizer 2000 manufactured by Malvern Panalytical Ltd.). From the obtained particle size distribution, a volume-based cumulative particle size distribution curve can be created, and the value of the particle diameter (D50) at 50% accumulation from the microparticle side can be taken as the average particle size of the powder. Furthermore, the particle size of the primary particles of the positive electrode active material can be measured as an arithmetic average of equivalent circle diameters in an electron micrograph.

<Conductive Material>

Examples of the conductive material include metal-based conductive materials such as metal particles and carbon-based conductive materials made of carbon materials.

Specific examples of the carbon-based conductive materials include graphite powder, carbon black (for example, acetylene black), and fibrous carbon materials (for example, graphitized carbon fiber and carbon nanotube).

The carbon-based conductive material may be composed of a single carbon material or plural carbon materials.

Furthermore, the specific surface area of the carbon material used as the carbon-based conductive material can be usually 0.1 to 500 $m^2/g$.

In this case, the conductive material can be composed only of 30 $m^2/g$ or more of a carbon-based conductive material, and may be 30 $m^2/g$ or more of carbon black, or 30 $m^2/g$ or more of acetylene black.

Note that, when an activation agent containing an alkali metal compound having oxidizability described later is used, the rate of oxidation treatment of the carbon-based conductive material can be increased, and even a carbon material having a small specific surface area can be oxidized in some cases.

<Binder>

Examples of the binder (binder before activation treatment) contained in the electrode material mixture are thermoplastic resins, specific examples thereof include fluororesins such as polyvinylidene fluoride (hereinafter, sometimes referred to as PVdF), polytetrafluoroethylene (hereinafter, sometimes referred to as PTFE), a tetrafluoroethylene-hexafluoropropylene-vinylidene fluoride-based copolymer, a hexafluoropropylene-vinylidene fluoride-based copolymer, and a tetrafluoroethylene-perfluorovinyl ether-based copolymer; polyolefin resins such as polyethylene and polypropylene; and a styrene butadiene copolymer (hereinafter, sometimes referred to as SBR), and a mixture of two or more kinds thereof may be used.

The blending amounts of the active material, the conductive material, and the binder in the electrode material mixture are not particularly limited. The blending amount of the binder can be 0.5 to 30 parts by weight and may be 1 to 5 parts by weight with respect to 100 parts by weight of the positive electrode active material. The blending amount of the conductive agent may be 0, but can be 0 to 50 parts by weight and may be 1 to 10 parts by weight with respect to 100 parts by weight of the positive electrode active material.

<Electrolyte>

Examples of the electrolyte include $LiPF_6$, $LiBF_4$, $LiClO_4$, $LiN(SO_2CF_3)_2$, $LiN(SO_2F)_2$, and $LiCF_3SO_3$. The amount of the electrolyte contained in the electrode material mixture is not limited, and may be 0.0005 to 7 mass %.

The electrode material mixture may contain a solvent derived from the electrolytic solution. Examples of the solvent include dimethyl carbonate, diethyl carbonate, and ethyl methyl carbonate.

Such an electrode material mixture can be obtained by separating and recovering the electrode material mixture from a waste electrode having a current collector and an electrode material mixture layer.

The "waste electrode" can be an electrode recovered from a discarded battery, and a waste material of an electrode generated in the processes for manufacturing electrodes and batteries. The discarded battery may be a used battery or may be an unused but non-standard battery. Furthermore, the waste material of an electrode can be an end part of an electrode generated in the manufacturing process for a battery, and a non-standard electrode. Furthermore, disposed articles of an electrode material mixture that is not stuck to a current collector, which are produced in an electrode material mixture production step, can also be used.

The electrode includes a current collector that is a metal foil such as an aluminum foil or a copper foil, and an electrode material mixture layer provided on the current collector. The electrode material mixture layer may be provided on one surface or both surfaces of the current collector.

Examples of the method of separating from the electrode material mixture from the electrode having an electrode material mixture layer and a current collector include a method of mechanically peeling the electrode material mixture layer from the current collector (for example, a method of scraping off the electrode material mixture from the current collector), a method of peeling the electrode material mixture layer from the current collector by infiltrating a solvent into an interface between the electrode material mixture layer and the current collector, and a method of separating the electrode material mixture layer by dissolving the current collector using an alkaline or acidic aqueous solution. A method of mechanically peeling the electrode material mixture layer from the current collector is preferable.

(Step of Cleaning Electrode Material Mixture)

Subsequently, an electrolyte cleaning solvent is brought into contact with the prepared electrode material mixture to remove at least a part of the electrolyte from the electrode material mixture. Specifically, an electrode material mixture containing a positive electrode active material, a binder, and an electrolyte is brought into contact with an electrolyte cleaning solvent to obtain a slurry containing a solid component and a liquid component, and then the slurry is separated into a solid component and a liquid component.

The solid-liquid separation is a step of separating the slurry into a liquid component and a solid component. The solid-liquid separation method may be a conventionally known method, and examples thereof include filtration and centrifugation.

The electrolyte cleaning solvent is not particularly limited. Examples thereof include carbonic acid esters such as ethylene carbonate, dimethyl carbonate, ethyl methyl carbonate, diethyl carbonate, and propylene carbonate; water; ketones such as acetone, methyl ethyl ketone, diethyl ketone, and methyl isobutyl ketone; and alcohols such as ethanol, methanol, propanol, and isopropyl alcohol.

The contact of the electrolyte cleaning solvent with the electrode material mixture can be performed in a known contact device between powder and liquid, for example, a stirring tank or the like.

In the step of bringing the electrode material mixture into contact with the electrolyte cleaning solvent, the slurry concentration, that is, the concentration of the solid component with respect to the volume of the slurry is preferably 3 to 2000 g/L.

In the step of bringing the electrode material mixture into contact with the electrolyte cleaning solvent, it is preferable to obtain a slurry by stirring the electrode material mixture and the electrolyte cleaning solvent. The peripheral speed of the tip of a stirring blade can be 0.1 to 1.0 m/s.

The contact method is not particularly limited, but the contact is preferably performed by the following step (a).

Step (a)

This is a step of obtaining the electrode material mixture from which at least a part of the electrolyte has been removed of step (1), and is a step of bringing an electrode material mixture containing a positive electrode active material, a binder, and an electrolyte into contact with an electrolyte cleaning solvent to obtain a slurry containing a solid component and a liquid component, and then separating the slurry into a solid component and a liquid component, in which the amount of P and the amount of F in the liquid component after separation are 0.0020 to 2.0 mass % and 0.01 to 7.0 mass %, respectively, and the amount of P remaining in the solid component after separation is 0.7 mass % or less.

In the step of cleaning the electrode material mixture, the obtained solid component may be rinsed after solid-liquid separation. The rinsing is an operation of bringing the obtained solid component into contact with the electrolyte cleaning solvent again to obtain a slurry, and then separating the slurry again into a solid component and a liquid component. In the cleaning of the electrode material mixture, rinsing may be performed a plurality of times. The slurry concentration in the rinsing can also be the same as described above. Also in the rinsing, the slurry can be stirred as described above.

In the step of cleaning the electrode material mixture, the contact time between the solid component and the liquid component is preferably 1 minute or more and less than 25 hours. The contact time between the solid component and the liquid component in the step of cleaning the electrode material mixture is a time during which the electrode material mixture is in contact with the electrolyte cleaning solvent. For example, when rinsing is not performed, the contact time between the solid component and the liquid component is a time A required from the start of contact between the electrode material mixture (solid component) containing an electrolyte and the electrolyte cleaning solvent to the completion of the operation of solid-liquid separating the slurry into a solid component and a liquid component. When rinsing is performed, the contact time between the solid component and the liquid component is the sum of the time A and a time B required from the start of contact between the solid component after separation and the electrolyte cleaning solvent to the completion of solid-liquid separation between the solid component and the liquid component in each rinsing step. When solid-liquid separation is performed by filtration, the completion time of solid-liquid separation is the end time of filtration.

In this step (a) described above, the amount of P and the amount F in the liquid component after solid-liquid separation are 0.0020 to 2.0 mass % and 0.01 to 7.0 mass %, respectively, and the amount of P remaining in the solid component after solid-liquid separation is 0.7 mass % or less.

Since the amount of P and the amount of F in the liquid component after solid-liquid separation and the amount of P in the solid component after solid-liquid separation are not too high, the electrolyte can be sufficiently removed from the electrode material mixture. For example, when the electrolyte remains, the following reaction occurs, and the structure of the positive electrode active material changes from a layered rock salt structure to a spinel structure.

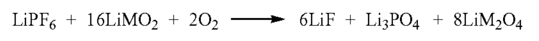

Furthermore, when lithium carbonate is contained as an activator, consumption of lithium by the following reaction also occurs.

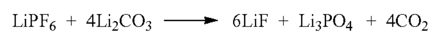

On the other hand, since the amount of P and the amount of F in the liquid component after solid-liquid separation are not too low, deterioration of the positive electrode active material due to excessive cleaning is suppressed.

Note that, in the case of performing one or more times of the rinsing step, the contents of P and F in the total liquid component obtained by mixing all of the liquid component obtained by the first solid-liquid separation and the liquid component obtained by the subsequent solid-liquid separation of one or more times of rinsing satisfy 0.0020 to 2.0 mass % and 0.01 to 7.0 mass %, respectively. In the case of performing one or more times of the rinsing step, the content of P in the solid component obtained by the last solid-liquid separation satisfies 0.7 mass % or less. Furthermore, when cleaning is performed continuously, the contents of P and F with respect to the liquid component continuously discharged from the device may be in the above range.

Furthermore, in any of cases of not performing rinsing and performing one or more times of rinsing, in the cleaning of the electrode material mixture, it is preferable that the content of P is 2.0 mass % or less and the content of F is 7.0 mass % or less in the liquid component obtained by the last solid-liquid separation, and it is also preferable that the content of P is 0.0020 mass % or more and the content of F is 0.01 mass % or more. Furthermore, when cleaning is performed continuously, the amounts of P and F with respect to the liquid component discharged from the device may be in ranges of 0.0020 to 2.0 mass % and 0.01 to 7.0 mass %, respectively.

The amount of P remaining in the solid component after solid-liquid separation may be 0.0001 mass % or more. The amount of F remaining in the solid component after solid-liquid separation can be 3.5 mass % or less and may be 0.0001 mass % or more.

The separated solid component can be subjected to drying of the electrolyte cleaning solvent by decompression and/or heating as necessary. The heating temperature can be set to 50 to 200° C.

In this way, an electrode material mixture from which at least a part of the electrolyte has been removed by cleaning is obtained.

(Mixing of Electrode Material Mixture from Which at Least Part of Electrolyte Has Been Removed and Activation Agent)

Subsequently, an activation agent containing one type or two or more types of alkali metal compounds is mixed with the obtained electrode material mixture to obtain a mixture.

The mixing method of the electrode material mixture and the activation agent may be either dry mixing or wet mixing, or a combination of these mixing methods, and the mixing order is also not particularly limited.

At the time of mixing, it is preferable to carry out a step of performing pulverization and mixing by using a mixing device equipped with mixing media such as balls, and accordingly, the mixing efficiency can be enhanced.

As the mixing method, from the viewpoint that mixing can be performed more conveniently, dry mixing is preferable. For the dry mixing, a V-type mixer, a W-type mixer, a ribbon mixer, a drum mixer, a powder mixer equipped with a stirring blade inside the mixer, a ball mill, a vibration mill, or a combination of these devices can be used.

As a mixing device used for dry mixing, a powder mixer equipped with a stirring blade inside the mixer is preferable, and specific examples thereof include a Loedige mixer (manufactured by MATSUBO Corporation).

Hereinafter, the activation agent used in this step will be described in detail.

<Activation Agent>

The activation agent contains one type or two or more types of alkali metal compounds. The activation agent preferably contains at least one compound selected from the group consisting of a potassium compound and a sodium compound. The activation agent may contain an alkali metal compound containing another alkali metal such as Li in addition to the potassium compound and/or the sodium compound.

When the activation agent comes into contact with the positive electrode active material, the positive electrode active material can be activated. When the alkali metal compound in the activation agent particularly includes a molten part, the contact property between the molten part and the positive electrode active material is improved, so that the activation of the positive electrode active material is further promoted.

Furthermore, the electrode material mixture may contain a fluorine-containing compound derived from the binder and/or the electrolytic solution, but by bringing the fluorine-containing compound into contact with the activation agent, a fluorine component is stabilized as an alkali metal fluoride, so that generation of a corrosive gas such as hydrogen fluoride can be suppressed. Note that it is desirable to prevent the generation of hydrogen fluoride also because the activity of the positive electrode active material is lowered.

The percentage of the whole alkali metal compound in the activation agent is appropriately set in consideration of the type of the alkali metal compound, the type of the positive electrode active material as a target, and the like, and is usually 50 wt % or more and preferably 70 wt % or more (including 100 wt %) with respect to the total weight of the activation agent.

The concentration of at least one type of alkali metal selected from the group consisting of potassium and sodium among the alkali metals contained in the alkali metal compound can be arbitrarily adjusted to 0 to 100 mol %, but is preferably 10 mol % or more, more preferably 20 mol % or more, and is preferably 90 mol % or less, and more preferably 80 mol % or less.

Examples of the alkali metal compound to be a component of the activation agent include hydroxide, borate, carbonate, oxide, peroxide, superoxide, nitrate, phosphate, sulfate, chloride, vanadate, bromide, molybdate, and tungstate of alkali metals. These can be used singly or in combination of plural ones thereof, as the component(s) of the activation agent.

Specific examples of suitable alkali metal compounds include hydroxides such as LiOH, NaOH, KOH, RbOH, and CsOH;

boron oxides such as $LiBO_2$, $NaBO_2$, $KBO_2$, $RbBO_2$, and $CsBO_2$;

carbonates such as $Li_2CO_3$, $Na_2CO_3$, $K_2CO_3$, $RbCO_3$, and $CsCO_3$;

oxides such as $Li_2O$, $Na_2O$, $K_2O$, $Rb_2O$, and $Cs_2O$;

peroxides such as $L_2O_2$, $Na_2O_2$, $K_2O_2$, $Rb_2O_2$, and $Cs_2O_2$;

superoxides such as $LiO_2$, $NaO_2$, $KO_2$, $RbO_2$, and $CsO_2$;

nitrates such as $LiNO_3$, $NaNO_3$, $KNO_3$, $RbNO_3$, and $CsNO_3$;

phosphates such as $Li_3PO_4$, $Na_3PO_4$, $K_3PO_4$, $Rb_3PO_4$, and $Cs_3PO_4$; sulfates such as $Li_2SO_4$, $Na_2SO_4$, $K_2SO_4$, $Rb_2SO_4$, and $Cs_2SO_4$;

chlorides such as LiCl, NaCl, KCl, RbCl, and CsCl;

bromides such as LiBr, NaBr, KBr, RbBr, and CsBr;

vanadates such as $LiVO_3$, $NaVO_3$, $KVO_3$, $RbVO_3$, and $CsVO_3$;

molybdates such as $Li_2MoO_4$, $Na_2MoO_4$, $K_2MoO_4$, $Rb_2MoO_4$, and $CsMoO_4$; and tungstates such as $Li_2WO_4$, $Na_2WO_4$, $K_2WO_4$, $Rb_2WO_4$, and $CsWO_4$.

Here, in order to further enhance the activation effect of the positive electrode active material, the activation agent can contain the same alkali metal element as the alkali metal element contained in the positive electrode active material in the electrode material mixture, in addition to at least one compound selected from the group consisting of a potassium compound and a sodium compound.

That is, when the positive electrode active material in the electrode material mixture is a lithium composite oxide, the activation agent preferably contains a lithium compound in addition to at least one compound selected from the group consisting of a potassium compound and a sodium compound. Suitable examples of the lithium compound include LiOH, $LiBO_2$, $Li_2CO_3$, $L_2O$, $L_2O_2$, $LiO_2$, $LiNO_3$, $Li_3PO_4$, $Li_2SO_4$, LiCl, $LiVO_3$, LiBr, $Li_2MoO_4$, and $Li_2WO_4$.

The activation agent may contain a compound except the alkali metal compound as necessary. Examples of the compound except the alkali metal compound include alkaline earth metal compounds containing alkaline earth metal elements such as magnesium, calcium, and barium. The alkaline earth metal compound is contained in the activation agent together with the alkali metal compound, for the purpose of controlling the melting start temperature of the activation agent.

Furthermore, the content of the compound except the alkali metal compound in the activation agent is selected to the extent that does not noticeably suppress the effect originating from the above-mentioned molten alkali metal compound, and is less than 50 wt % of the total weight of the activation agent.

The addition amount of the activation agent in the mixture of the electrode material mixture and the activation agent is preferably 0.001 to 100 times and more preferably 0.05 to 1 time with respect to the weight of the positive electrode active material contained in the electrode material mixture.

Regarding the number of moles of the alkali metal compound in the activation agent in the mixture of the electrode material mixture and the activation agent, the alkali metal compound can be added such that when the number of moles of the positive electrode active material (for example, formula A) contained in the electrode material mixture is taken as 1, the number of moles of alkali metal element is 0.001 to 200 times.

By appropriately controlling the proportion of the activation agent in the mixture, the cost required for recovering the positive electrode active material from the electrode material mixture can be reduced, and the rate of the oxidation decomposition treatment of the carbon-based conductive material or the binder can be increased. Furthermore, the effect of preventing the generation of a corrosive gas in the heating step can be improved, and further, the discharge capacity of a battery produced using the positive electrode active material to be obtained can be further increased.

Furthermore, at least one type of the alkali metal compounds contained in the activation agent is preferably an alkali metal compound exhibiting alkalinity when dissolved in water. An activation agent containing such an alkali metal compound is such that when dissolved in pure water, the pH of the solution is greater than 7. Hereinafter, such an activation agent may be referred to as "alkaline activation agent".

Since the generation of a corrosive gas in a heating step can be further suppressed by using the alkaline activation agent, the discharge capacity of a battery produced using the positive electrode active material to be recovered can be further increased. Furthermore, by using the alkaline activation agent, the rate of the oxidation decomposition treatment for the carbon-based conductive material or the binder can also be increased.

Examples of the alkali metal compound exhibiting alkalinity when dissolved in water contained in the alkaline activation agent include hydroxides, carbonates, hydrogen carbonates, oxides, peroxides, and superoxides of alkali metals. Specific examples thereof include LiOH, NaOH, KOH, RbOH, CsOH; $Li_2CO_3$, $Na_2CO_3$, $K_2CO_3$, $RbCO_3$, $CsCO_3$; $LiHCO_3$, $NaHCO_3$, $KHCO_3$, $RbHCO_3$, $CsHCO_3$; $Li_2O$, $Na_2O$, $K_2O$, $Rb_2O$, $Cs_2O$; $Li_2O_2$, $Na_2O_2$, $K_2O_2$, $Rb_2O_2$, $Cs_2O_2$; $LiO_2$, $NaO_2$, $KO_2$, $RbO_2$, and $CsO_2$. One type or two or more types of these may be contained in the activation agent.

Furthermore, when the conductive material contained in the electrode material mixture is a carbon-based conductive material, at least one type of alkali metal compounds contained in the activation agent may be an alkali metal compound having oxidizability for oxidatively decomposing the carbon-based conductive material at a temperature of the heating step. Note that an activation agent containing such an alkali metal compound may be hereinafter referred to as "activation agent having oxidizability".

When an activation agent having such oxidizability is used, oxidation of the conductive material, which is a carbon material, into carbon dioxide is promoted, the activation agent particularly exhibits an effect in promoting oxidation of the binder, which is a hydrocarbon material, into carbon dioxide and water vapor, the discharge capacity of a battery produced using the positive electrode active material to be obtained can be further increased, and an effect of preventing the generation of a corrosive gas in the heating step be further improved in some cases.

Examples of the alkali metal compound having oxidizability necessary for oxidizing a carbon-based conductive material and a hydrocarbon into carbon dioxide and water vapor include peroxides, superoxides, nitrates, sulfates, vanadates, and molybdates of alkali metals. These may be used singly or as a combination of two or more kinds thereof.

Specific examples thereof include $L_2O_2$, $Na_2O_2$, $K_2O_2$, $Rb_2O_2$, $Cs_2O_2$; $LiO_2$, $NaO_2$, $KO_2$, $RbO_2$, $CsO_2$; $LiNO_3$, $NaNO_3$, $KNO_3$, $RbNO_3$, $CsNO_3$; $Li_2SO_4$, $Na_2SO_4$, $K_2SO_4$, $Rb_2SO_4$, $Cs_2SO_4$; $LiVO_3$, $NaVO_3$, $KVO_3$, $RbVO_3$, $CsVO_3$; $Li_2MoO_4$, $Na_2MoO_4$, $K_2MoO_4$, $Rb_2MoO_4$, $CsMoO_4$.

The details of the oxidizability of these alkali metal compounds are described in Japanese Unexamined Patent Application Publication No. 2012-186150.

Step (2): Heating Step

The heating step is a step of heating the mixture obtained in step (1) (hereinafter, referred to as "mixture before heating" in some cases) to a temperature equal to or higher than the melting start temperature of the activation agent. The mixture obtained in this heating step is referred to as "mixture after heating" or "mixture after step (2)" in some cases.

Note that the "melting start temperature (Tmp) of the activation agent" means the lowest temperature at which a part of the activation agent exhibits a liquid phase.

The melting start temperature (Tmp) of the activation agent is a value determined by differential thermal analysis (DTA). That is, 5 mg of the mixture before heating is subjected to differential thermal analysis (DTA, measurement condition: temperature increase rate: 10° C./min), and a temperature at which the DTA signal indicates an endothermic peak is defined as the melting start temperature (Tmp).

The melting start temperature (Tmp) of the activation agent is preferably 700° C. or lower, and more preferably 600° C. or lower. There is no lower limit to the melting start temperature (Tmp) of the activation agent, but it may be, for example, 150° C.

Furthermore, the melting point of the activation agent means the lowest temperature at which a part of the activation agent exhibits a liquid phase when only the activation agent is heated. When the electrode material mixture and the activation agent are mixed, the melting start temperature (Tmp) of the activation agent is lower than the melting point of the activation agent.

The melting point of the activation agent is a value determined by differential thermal analysis (DTA). Specifically, 5 mg of the activation agent is subjected to differential thermal analysis (DTA, measurement condition: temperature increase rate: 10° C./min), and a temperature at which the DTA signal indicates an endothermic peak is defined as the melting point of the activation agent.

The atmosphere in the heating is not particularly limited, and may be an oxygen-containing gas such as air, nitrogen, argon, or carbon dioxide. The pressure of the atmosphere is not particularly limited, and may be atmospheric pressure, but may be a reduced pressure atmosphere or a pressurized atmosphere.

In step (2), the following action occurs as a result of heating the mixture before heating to a temperature equal to or higher than the melting start temperature (Tmp) of the activation agent as described above.

When the activation agent in a fused state comes into contact with the positive electrode active material, deterioration of the crystal structure of the positive electrode active material can be suppressed. Furthermore, depending on cases, a crystal structure repairing action can also be obtained.

When the activation agent in a fused state comes into contact with a carbon-based conductive material or a binder, the rate of oxidative decomposition of the conductive material and the binder is increased, and further, when the activation agent in a fused state comes into contact with a fluorine compound derived from the binder and the electrolytic solution, a fluorine component is stabilized as an alkali metal fluoride, the generation of hydrogen fluoride, which is a corrosive gas, is prevented, and deterioration of the crystal structure of the positive electrode active material is suppressed.

Further, when the activation agent contains the same alkali metal as that of the positive electrode active material, it is also possible to supply the alkali metal that is insufficient for the positive electrode active material.

The temperature of the heating step and the retention time at that temperature can be appropriately regulated by means of the respective types and combinations of the positive electrode active material, the conductive material, and the binder constituting the electrode material mixture, and the alkali metal compound and other compounds, which are contained in the activation agent. Usually, the temperature is in a range of 100 to 1500° C., and the retention time is about 10 minutes to 24 hours.

It is preferable that the temperature of the heating step is a temperature higher than the melting point of the alkali metal compound contained in the activation agent. Note that, when a plurality of compounds is mixed, the melting point of the alkali metal compound may be lower than the melting point of a simple substance of each of the compounds. When the activation agent contains two or more kinds of alkali metal compounds, the eutectic point is considered as the melting point of the alkali metal compound.

After the heating step, as necessary, the mixture can be cooled to any temperature such as, for example, about room temperature.

Step (3): Solid-Liquid Separation Step (Removal of Alkali Metal)

a step of bringing the mixture after heating into contact with a water-containing liquid to obtain a slurry containing a solid component and a liquid component, and then separating the slurry into a solid component and a liquid component The mixture after heating contains, in addition to the positive electrode active material, a component derived from the activation agent (such as an alkali metal compound), an undecomposed conductive material or binder, and other undecomposed product of the electrode material mixture. Furthermore, when an electrolytic solution containing a fluorine component is contained in the electrode material mixture, a fluorine component derived from the electrolyte may be contained.

In order to separate and recover the positive electrode active material from the mixture after heating, a water-containing liquid is added to the mixture to form a slurry, and then solid-liquid separation is performed to separate the slurry into a solid component and a liquid component.

The liquid in the slurrying step is not particularly limited as long as it contains water. The amount of water in the liquid may be 50 mass % or more. In order to increase the solubility of water-soluble components or to increase the dissolution rate, the pH may be adjusted by adding components except water to the liquid.

Suitable examples of the water-containing liquid include pure water and an alkaline cleaning liquid. Examples of the alkaline cleaning liquid include aqueous solution of one or more types of anhydrides selected from the group consisting of lithium hydroxide, sodium hydroxide, potassium hydroxide, lithium carbonate, sodium carbonate, potassium carbonate, and ammonium carbonate, and hydrates thereof. Furthermore, ammonia can also be used as an alkali.

The slurry to be obtained contains a solid component mainly containing a positive electrode active material and a liquid component containing a water-soluble component except the positive electrode active material. Note that the liquid component includes an alkali metal component derived from the activation agent and/or a fluorine component derived from the binder and the electrolytic solution.

The amount of the liquid to be added to the mixture is appropriately determined in consideration of the respective amounts of the positive electrode active material contained in the mixture and the water-soluble component except the positive electrode active material.

In step (3), it is preferable to bring the mixture after heating into contact with the water-containing liquid so that the slurry concentration, that is, the concentration of the solid component with respect to the volume of the slurry is 12 to 1000 g/L.

In step (3), it is preferable to obtain a slurry by stirring the mixture after heating and the water-containing liquid. As a result, the dissolution of the water-soluble component is promoted. The peripheral speed of the tip of a stirring blade is preferably set to 0.1 to 0.9 m/s.

The slurry formed in the slurrying step is then subjected to solid-liquid separation. The solid-liquid separation is a step of separating the slurry into a liquid component and a solid component. The solid-liquid separation method may be a conventionally known method, and examples thereof include filtration and centrifugation.

In step (3), the obtained solid component may be rinsed after solid-liquid separation. The rinsing is an operation of bringing the obtained solid component into contact with the water-containing liquid again to obtain a slurry, and then separating the slurry again into a solid component and a liquid component. In step (3), rinsing may be performed a plurality of times. The slurry concentration in the rinsing can also be the same as described above.

In step (3), the contact time between the solid component and the liquid component is preferably 4 minutes or more and less than 24 hours. The contact time between the solid component and the liquid component in step (3) is a time during which the positive electrode active material is in contact with the water-containing liquid. For example, when rinsing is not performed, the contact time between the solid component and the liquid component is a time C required from the start of contact between the mixture after heating and the water-containing liquid to the completion of the operation of solid-liquid separating the slurry into a solid component and a liquid component. When rinsing is performed, the contact time between the solid component and the liquid component is the sum of the time C and a time D required from the start of contact between the solid component after separation and the water-containing liquid to the completion of solid-liquid separation between the solid component and the liquid component in each rinsing step. When solid-liquid separation is performed by filtration, the completion time of solid-liquid separation is the end time of filtration.

In step (3), it is preferable that the total content of potassium and sodium in the liquid component obtained by solid-liquid separation is 0.090 to 2.0 mass %, and the total content of potassium and sodium in the solid component obtained by solid-liquid separation is 1.2 mass % or less.

Since the total content of potassium and sodium in the liquid component and the total content of potassium and sodium in the solid component after solid-liquid separation are not too high, the alkali metal component can be sufficiently removed from the electrode material mixture. On the other hand, since the total content of potassium and sodium in the liquid component is not too low, deterioration of the positive electrode active material due to excessive cleaning is suppressed.

Note that, in the case of performing one or more times of the rinsing step, the total content of potassium and sodium in the total liquid component obtained by mixing all of the liquid component obtained by the first solid-liquid separation and the liquid component obtained by the subsequent solid-liquid separation of one or more times of rinsing satisfies 0.090 to 2.0 mass %. In the case of performing one or more times of the rinsing step, the total content of potassium and sodium in the solid component obtained by the last solid-liquid separation satisfies 1.2 mass % or less. Furthermore, when cleaning is performed continuously, the total content of potassium and sodium with respect to the liquid component continuously discharged from the device may be in a range of 0.090 to 2.0 mass %. Furthermore, in any of cases of not performing rinsing and performing one or more times of rinsing, in the cleaning of the electrode material mixture, the total content of potassium and sodium is preferably 0.090 to 2.0 mass % in the liquid component obtained by the last solid-liquid separation.

The lower limit of the total content of potassium and sodium in the separated solid component may be 0.001 mass %.

Step (4): Drying Step of Positive Electrode Active Material

Step (4) is a step of removing water from the solid component separated in step (3) by subjecting the solid component to heating and/or a reduced-pressure environment. Here, it is preferable to change an ambient pressure at which the solid component exists and/or a temperature of the solid component so that the ratio of the saturated water vapor pressure at the temperature of the solid component to the ambient pressure becomes 80% or more within 24 hours after the slurry is separated into the solid component and the liquid component in step (3).

When the ratio of the saturated water vapor pressure at the temperature of the solid component to the ambient pressure at which the solid component exists is 80% or more, this is a condition under which water is sufficiently removed from the solid component.

As described above, when such a condition is reached within 24 hours after the slurry is separated into the liquid component and the solid component, a time during which the solid component is exposed to a wet environment is shortened, whereby deterioration of the positive electrode active material can be suppressed.

The time from when the slurry was separated into a solid component and a liquid component until the ratio of the saturated water vapor pressure at the temperature of the solid component to the ambient pressure at which the solid component exists reaches 80% or more may be within 15 hours, within 10 hours, within 5 hours, within 2 hours, within 1 hour, or within 40 minutes.

Specifically, for example, the following reaction may proceed in a wet environment.

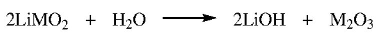

Furthermore, the following reaction may also proceed in a wet environment containing carbon dioxide such as air.

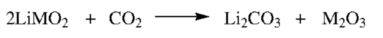

Specifically, a condition under which water is sufficiently removed from the solid component only by decompression may be reached, a condition under which water is sufficiently removed from the solid component only by heating may be reached, or a condition under which water is sufficiently removed from the solid component by heating and decompression may be reached. The saturated water vapor pressure at an arbitrary temperature can be estimated by the following Antoine equation.

$$\log_{10} p = A - \frac{B}{T + C}$$ [Mathematical Formula 1]

Here, when the unit of p is mmHg and the unit of T is Celsius temperature (° C.), in the case of pure water, A=8.02754, B=1705.616, and C=231.405.

The time until the ratio of the saturated water vapor pressure at the temperature of the solid component to the ambient pressure at which the solid component exists becomes 80% or more can be measured by monitoring the ambient pressure at which the solid component exists and the temperature of the solid component. Specifically, for example, a sensor such as a pressure gauge and a hygrometer provided in a dryer may be used.

The heating temperature is preferably 100° C. or higher in order to remove water contained in the liquid used in step (3). The temperature is preferably 150° C. or higher in order to more sufficiently remove water. In particular, a temperature of 250° C. or higher is preferable because the discharge capacity of a battery produced using the positive electrode active material to be obtained is further increased. The temperature in the drying step may be constant, or may be changed stepwise or continuously. The attainment temperature range of the heating can be set to, for example, 10° C. or higher and lower than 900° C.

The ultimate pressure range of the decompression can be set to, for example, $1.0\times10^{-10}$ to $1.0\times10^{3}$ Pa.

Step (5): Heat Treatment (Additional Drying and Annealing (Recalcination)) Step

In step (5), the solid component dried in step (4) until the ratio of the saturated water vapor pressure at the temperature of the solid component to the ambient pressure at which the solid component exists becomes 80% or more is heat-treated at lower than 900° C. In the present embodiment, after step (4), the heat treatment is not performed at 900° C. or higher.

The atmosphere of the heat treatment is not limited, and may be a reduced pressure atmosphere, or an oxygen atmosphere such as air, and the heat treatment may be performed in a reduced pressure atmosphere and then the heat treatment may be performed in an oxygen atmosphere. The heat treatment is preferably performed at least in an oxygen-containing atmosphere such as air. Furthermore, the temperature of the heat treatment can be set to 100° C. or higher. Furthermore, the retention time of the heat treatment can be set to 1 minute to 24 hours, and is preferably 1 minute to 24 hours in an oxygen atmosphere. For example, after step (4), the heat treatment can be performed at lower than 900° C. for about 1 minute to 24 hours in a reduced pressure atmosphere, and then the heat treatment can be performed at lower than 900° C. for about 1 minute to 24 hours in an oxygen atmosphere such as air. In particular, it is preferable to perform heating at a retention temperature of 350° C. or higher for 0.1 hours or more and 5 hours or less in an oxygen atmosphere.

The heat treatment may be performed subsequently to step (4) in a dryer or the like that performs step (4), or after the temperature is returned to room temperature after the drying in step (4), the heat treatment may be performed in a device such as a crucible different from the dryer.

By using the method for producing a positive electrode active material of the present invention, the positive electrode active material obtained from the battery material mixture can be reused in the same manner as an unused active material. Methods for producing an electrode and a battery using a positive electrode active material are well known.

The discharge capacity of the finally obtained positive electrode active material according to an embodiment of the present invention can be 150 mAh/g or more.

EXAMPLES

Hereinafter, the present invention will be described in more detail with reference to Examples; however, the present invention is not limited to the following Examples unless the gist thereof is changed.

Measurement of physical properties of a positive electrode active material and a charge and discharge test of a battery using the positive electrode active material were performed as follows.

(1) Content of Element

For the solution and the acid solution in which the powder was dissolved, the content of the alkali metal element contained in the solution and the powder was analyzed using an ICP emission spectrometer (for example, SPS3000 manufactured by SII NanoTechnology Inc.).

(2) Charge and Discharge Test

1. Production of Electrode (Positive Electrode)

For measurement of the discharge capacity of the positive electrode active material, an electrode (positive electrode) was produced according to the following procedures.

Each positive electrode active material, a binder (PVdF #1100 (manufactured by KUREHA CORPORATION)), and a conductive material (acetylene black (manufactured by Denki Kagaku Kogyo Co., Ltd., product number: DENKA BLACK HS100) were mixed so that the weight ratio of the positive electrode active material:the binder:the conductive material was 92:3:5. Here, as PVdF as a binder, a binder solution obtained by dissolving PVdF in NMP in advance was used. NMP was added and adjusted so that the total weight of the positive electrode active material, the conductive material, and the binder in a positive electrode material mixture paste was 50 wt %. A positive electrode material mixture paste was produced by kneading with a planetary centrifugal mixer (ARE-310 manufactured by Thinky Corporation).

Note that, as the binder solution, an NMP solution in which PVdF as a binder was dissolved was used, and NMP was added so that the total weight of the positive electrode active material, the conductive material, and the binder in the positive electrode material mixture paste was 50 wt %.

The positive electrode material mixture paste was applied onto an aluminum foil 1085 (manufactured by Nippon Foil Mfg. Co., Ltd.) for a lithium ion secondary battery positive electrode current collector, the aluminum foil having a thickness of 20 μm as a current collector so that the amount of the positive electrode active material was 3.0±0.1 mg/cm$^2$, and then vacuum-dried at 150° C. for 8 hours to obtain a positive electrode. The electrode area of the positive electrode was 1.65 cm$^2$.

2. Production of Battery

A non-aqueous electrolyte secondary battery (coin type battery R2032) was produced by combining the above-described positive electrode, an electrolytic solution, a separator, and a negative electrode. Note that assembling of the battery was performed in an argon atmosphere in a glove box.

As the electrolytic solution, a solution obtained by dissolving $LiPF_6$ to a ratio of 1.0 mol/L in a mixed solution of ethylene carbonate, dimethyl carbonate, and ethyl methyl carbonate at a ratio of 30:35:35 (volume ratio) was used.

As the separator, a laminated film separator in which a heat-resistant porous layer was laminated on a porous film made of polyethylene was used. Furthermore, metal lithium was used as the negative electrode.

3. Charge and Discharge Test

The internal resistance was measured by using the produced coin type battery after initial charging and discharging at 25° C.

Initial Charging and Discharging

Maximum charging voltage: 4.3 V, charging current: 0.2 C, constant current constant voltage charging Minimum discharging voltage: 2.5 V, discharging current: 0.2 C, constant current discharging (Initial Discharge Capacity Recovery Rate)

When the discharge capacity at 0.2 C in the initial charging and discharging of the reactivated positive electrode active material is defined as X mAh/g and the discharge capacity at 0.2 C in the initial charging and discharging of the unused positive electrode active material is defined as Y mAhLg, an initial discharge capacity recovery rate is determined by the following formula (a).

$$\text{Initial discharge capacity recovery rate (\%)} = X/Y \times 100 \quad \text{(a)}$$

Internal Resistance Measurement

Constant current constant voltage charging was performed at a maximum charging voltage of 4.3 V and a charging current of 0.2 C, scanning was performed at a frequency of 1 MHz to 0.1 Hz using an AC impedance measuring device (frequency response analyzer solartron 1260, potentio/galvanostat solartron 1287), and a Cole-Cole plot showing an imaginary part on the vertical axis and a real part on the horizontal axis was created. Subsequently, in this Cole-Cole plot, an arc portion included in 100 Hz to 1 Hz was fitted with a circle, the diameter of the circle was taken as the resistance value, which was taken as the internal resistance of the positive electrode active material.

(Internal Resistance Recovery Rate)

When the internal resistance of the reactivated positive electrode active material is defined as x Ω and the internal resistance of the unused positive electrode active material is defined as y Ω, an internal resistance recovery rate is determined by the following formula (b).

$$\text{Internal resistance recovery rate (\%)} = y/x \times 100 \quad \text{(b)}$$

EXAMPLES AND COMPARATIVE EXAMPLES

A. Production of Positive Electrode A

As the positive electrode active material, a positive electrode active material having a composition of $Li_{1.04}N_{0.60}Co_{0.20}Mn_{0.20}O_2$ and a crystal structure of R-3m was used. The rated capacity of the positive electrode active material was 160 mAh/g, and the 1 C current was 160 mA/g. The initial discharge capacity at 0.2 C measured in the charge and discharge test using the coin type battery using this positive electrode active material (unused active material) as a positive electrode active material was 183 mAh/g.

As the conductive material, acetylene black HS100 (manufactured by Denki Kagaku Kogyo Co., Ltd.) was used.

As the binder and the solvent, an NMP solvent was further added to an NMP solution (manufactured by KUREHA CORPORATION) containing 12 wt % of PVdF #1100 as a binder to obtain a predetermined ratio.

The mass ratio of the positive electrode active material, the binding agent, and the conductive material in the positive electrode material mixture was 92:3:5. The blending amount of the solvent was 50 mass % with respect to the entire positive electrode material mixture paste.

The positive electrode material mixture paste was applied onto an aluminum foil for 1085 (manufactured by Nippon Foil Mfg. Co., Ltd.) for a lithium ion secondary battery positive electrode current collector, the aluminum foil having a thickness of 20 μm, using a doctor blade type coater, and dried to obtain a positive electrode A. The positive electrode active material layer on the aluminum foil was 20 $mg/cm^2$.

B. Recovery of Electrode Material Mixture from Positive Electrode A

The electrode material mixture was mechanically peeled from the current collector from the positive electrode A.

C. Electrolytic Solution Immersion Step

The peeled electrode material mixture was pulverized into powder. An electrolytic solution was added to the powder of the electrode material mixture so as to have a slurry concentration of 1500 g/L to form a slurry. Here, as the electrolytic solution, a solution obtained by dissolving $LiPF_6$ as an electrolyte to a ratio of 1.0 mol/L in a mixed solution of ethylene carbonate, dimethyl carbonate, and ethyl methyl carbonate at a ratio of 30:35:35 (volume ratio) was used. The slurry of the electrode material mixture was stirred at a maximum flow rate of 0.550 m/see for 1 minute. Thereafter, the slurry was filtered to separate the solid phase, and the solid phase was dried under reduced pressure for 24 hours to obtain an electrolyte-containing electrode material mixture. Note that the electrolytic solution immersion step was performed in an argon atmosphere in a glove box.

D. Electrolyte-Containing Electrode Material Mixture Cleaning Step

Dimethyl carbonate as an electrolyte cleaning solvent was added to the obtained electrolyte-containing electrode material mixture so as to have a slurry concentration of 535 g/L to form a slurry, stirring was performed for 5 minutes at a peripheral speed of the tip of the stirring blade of 0.550 m/s, and then the slurry was filtered over 3 minutes to be separated into a solid component and a liquid component. That is, the contact time between the solid component and the liquid component was 8 minutes.

The obtained solid component was dried under reduced pressure at 100° C. for 1 hour, and the electrode material mixture after cleaning was recovered.

E. Activation Agent Mixing Step (Corresponding to Step (1))

$Li_2CO_3$ and $K_2SO_4$ as activation agents were mixed with the cleaned electrode material mixture so as to be 0.15 mol and 0.15 mol with respect to 1 mol of the positive electrode active material in the electrode material mixture to obtain a mixture (mixture before heating). The melting start temperature of the activation agent was 550° C.

F. Heating Step (Corresponding to Step (2))

The obtained mixture before heating was placed in an alumina calcination container and placed in an electric furnace. Under atmospheric pressure, the mixture before heating was subjected to an activation treatment at a retention temperature of 700° C. for a retention time of 3 hours. The heating rate was 300° C./hour, and the cooling to room temperature was natural cooling. After cooling to room temperature, the mixture after heating was recovered.

G. Step of Removing Alkali metal (Corresponding to Water Washing and Solid-Liquid Separation in Step (3))

The mixture after heating was pulverized, water was added thereto, and the mixture was stirred for 1 minute to form a slurry. Thereafter, the slurry was filtered over 3 minutes to be separated into a solid component and a liquid component. The slurry concentration was 20 g/L, the contact time between the solid component and the liquid component (water) was 4 minutes, and the peripheral speed (maximum flow rate) of the tip of the stirring blade was 0.785 m/s.

H. Drying Step of Positive Electrode Active Material (Corresponding to Step (4)) and Heat Treatment Step (Corresponding to Step (5))

In Example 1, the separated solid component was subjected, in a vacuum dryer, to a reduced-pressure so that the set (final) pressure at 25° C. was $1.3\times10^{-4}$ MPa, and then heated at a set (final) temperature of 100° C. The saturated water vapor pressure at 25° C. is 0.031 MPa (calculated from the Antoine equation). The ambient pressure was reduced to more than 0.025 MPa at which the saturated water vapor pressure of water was 80%, so as to be $1.3\times10^{-4}$ MPa. In Example 1, in the process in which the pressure decreased to the set pressure, the time required for the ratio of the saturated water vapor pressure at the temperature of the solid component to the ambient pressure at which the solid component existed to reach 80% after the slurry was separated into a solid component and a liquid component was 20 minutes. After reaching 80% and further reaching the set pressure, drying under reduced pressure was performed for 60 minutes by heating to 100° C. Thereafter, the decompression was stopped, and the heat treatment was performed for 60 minutes in an atmospheric atmosphere at normal pressure with the temperature of the solid component set to 100° C. Thereafter, natural cooling was performed.

In Examples 2 to 8 and Comparative Example 1, after the ratio of the saturated water vapor pressure of water to the ambient pressure at which the solid component existed reached 80%, and further, the pressure reached the set pressure, heating and drying were performed at a set (final) temperature of 100° C. Thereafter, the procedure was performed in the same manner as in Example 1 except that the heat treatment was performed for 60 minutes in an atmospheric atmosphere with the temperature of the solid component set to 200° C., 300° C., 400° C., 500° C., 600° C., 700° C., 800° C., and 900° C.

In Example 9, the separated solid component was heated and dried in an atmospheric atmosphere at normal pressure at a set (final) temperature of 700° C. in an electric furnace. In this case, it can be calculated from the Antoine equation when the atmospheric pressure of 0.1 MPa is the ambient pressure, and the temperature at which the saturated water vapor pressure reaches 0.08 MPa, which is 80% of the ambient pressure, is 94° C. The time required for the ratio of the saturated water vapor pressure of water at the temperature of the solid component to the ambient pressure at which the solid component existed to reach 80% (temperature 94° C.) after the slurry was separated into a solid component and a liquid component was 20 minutes. After reaching 80%, the heat treatment was performed for 60 minutes in an atmospheric atmosphere at normal pressure with the temperature of the solid component set to 700° C.

In Comparative Example 2, the separated solid component was held at a set (final) temperature of 50° C. in a thermostatic bath, and then subjected, in a vacuum dryer, to a reduced-pressure so that the set (final) pressure was $1.3\times10^{-4}$ MPa. The time required for the ratio of the saturated water vapor pressure of water at the temperature of the solid component to the ambient pressure at which the solid component existed to reach 80% after the slurry was separated into a solid component and a liquid component was 1460 minutes (24 hours and 20 minutes). The breakdown was that the retention (leaving to stand still) before decompression was 1440 minutes and the retention during decompression was 20 minutes. Thereafter, the decompression was stopped, and the heat treatment was performed for 60 minutes in an atmospheric atmosphere at normal pressure with the temperature of the solid component set to 100° C.

In Comparative Example 3, the separated solid component was heated and dried in an atmospheric atmosphere at normal pressure at a set (final) temperature of 50° C. in a dryer. After the slurry was separated into a solid component and a liquid component, the ratio of the saturated water vapor pressure of water at the temperature of the solid component to the ambient pressure at which the solid component existed did not reach 80%. No subsequent heat treatment was performed.

The conditions in Examples and Comparative Examples are shown in Table 1 and Table 2.

As described above, positive electrode active materials of Examples and Comparative Examples were obtained.

For the recovered reactivated positive electrode active material, a coin type battery was produced, and a charge and discharge test was performed. The discharge capacity and the internal resistance were measured by the charge and discharge test, and the initial discharge capacity recovery rate and the internal resistance recovery rate were determined.

The initial discharge capacity recovery rate and the internal resistance recovery rate in each of Examples and Comparative Examples are shown in Table 1 and Table 2.

TABLE 1

| | | New product | Example 1 | Example 2 | Example 3 | Example 4 | Example 5 | Example 6 |
|---|---|---|---|---|---|---|---|---|
| Heating temperature in drying step | ° C. | — | 100 | 100 | 100 | 100 | 100 | 100 |
| Saturated water vapor pressure of solvent at heating temperature | MPa | — | 0.1 | 0.1 | 0.1 | 0.1 | 0.1 | 0.1 |
| Ambient pressure in drying step | MPa | — | $1.3 \times 10^{-4}$ | $1.3 \times 10^{-4}$ | $1.3 \times 10^{-4}$ | $1.3 \times 10^{-4}$ | $1.3 \times 10^{-4}$ | $1.3 \times 10^{-4}$ |
| Elapsed time until saturated water vapor pressure of solvent reaches 80% of ambient pressure | min | — | 20 | 20 | 20 | 20 | 20 | 20 |
| Recalcination temperature | ° C. | — | 100 | 200 | 300 | 400 | 500 | 600 |
| Initial discharge capacity | mAh/g | 183 | 166 | 162 | 170 | 170 | 168 | 162 |
| Internal resistance at SOC 100% | Ω | 17.0 | 217.7 | 238.4 | 150.6 | 205.7 | 107.7 | 83.4 |
| Initial discharge capacity recovery rate | % | 100 | 90.8 | 88.5 | 93.0 | 92.7 | 91.6 | 88.3 |
| Internal resistance recovery rate | % | 100 | 7.8 | 7.1 | 11.3 | 8.3 | 15.8 | 20.4 |

TABLE 2

| | | Example 7 | Example 8 | Example 9 | Comparative Example 1 | Comparative Example 2 | Comparative Example 3 |
|---|---|---|---|---|---|---|---|
| Heating temperature in drying step | ° C. | 100 | 100 | 700 | 100 | 50 | 50 |
| Saturated water vapor pressure of solvent at heating temperature | MPa | 0.1 | 0.1 | 0.1 | 0.1 | $1.2 \times 10^{-2}$ | $1.2 \times 10^{-2}$ |
| Ambient pressure in drying step | MPa | $1.3 \times 10^{-4}$ | $1.3 \times 10^{-4}$ | 0.1 | $1.3 \times 10^{-4}$ | $1.3 \times 10^{-4}$ | 0.1 |
| Elapsed time until saturated water vapor pressure of solvent reaches 80% of ambient pressure | min | 20 | 20 | 20 | 20 | 1460 | — |
| Recalcination temperature | ° C. | 700 | 800 | 700 | 900 | 100 | — |
| Initial discharge capacity | mAh/g | 171 | 160 | 168 | 119 | 158 | 164 |
| Internal resistance at SOC 100% | Ω | 44.5 | 42.2 | 31.8 | 1652 | 1083 | 479.6 |
| Initial discharge capacity recovery rate | % | 93.6 | 87.3 | 92.0 | 65.0 | 86.1 | 89.3 |
| Internal resistance recovery rate | % | 38.2 | 40.3 | 53.5 | 1.0 | 1.6 | 3.5 |

In Examples 1 to 9 in which the ratio of the saturated water vapor pressure at the temperature of the solid component to the ambient pressure at which the solid component existed was increased to 80% or more and the recalcination temperature was set to lower than 900° C. within 24 hours after the slurry was separated into a solid component and a liquid component in step (4), the recovery rate of the internal resistance was also higher and the retention rate of the initial discharge capacity was also higher than those in Comparative Examples 1 to 4.

The invention claimed is:

1. A method for producing a positive electrode active material, the method comprising the following steps of:

(1) mixing an activation agent containing one type or two or more types of alkali metal compounds with an electrode material mixture which contains a positive electrode active material, a binder, and an electrolyte and from which at least a part of the electrolyte has been removed by contact with an electrolyte cleaning solvent to obtain a mixture;

(2) heating the mixture at a retention temperature equal to or higher than a melting start temperature of the activation agent;

(3) bringing the mixture after step (2) into contact with a water-containing liquid to obtain a slurry containing a solid component and a liquid component, and then separating the slurry into a solid component and a liquid component;

(4) removing water from the obtained solid component by subjecting the solid component to heating and/or a reduced-pressure environment, wherein an ambient pressure at which the solid component exists and/or a temperature of the solid component is changed so that a ratio of saturated water vapor pressure at the temperature of the solid component to the ambient pressure becomes 80% or more within 24 hours after the slurry is separated into the solid component and the liquid component; and (5) heat-treating the solid component after step (4) at lower than 900° C.

2. The method according to claim 1, wherein the positive electrode active material is a composite oxide containing one or more types of elements selected from the following element group 1 and one or more types of elements selected from the following element group 2:

element group 1: Ni, Co, Mn, Fe, Al, and P; and element group 2: Li, Na, K, Ca, Sr, Ba, and Mg.

3. The method according to claim 1, wherein the positive electrode active material is represented by the following formula:

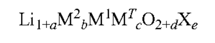

$$Li_{1+a}M^2_bM^1M^T_cO_{2+d}X_e$$

provided that, $M^2$ represents at least one type of element selected from the group consisting of Na, K, Ca, Sr, Ba, and Mg, $M^1$ represents at least one type of element selected from the group consisting of Ni, Co, Mn, Fe, Al, and P, $M^T$ represents at least one type of element selected from the group consisting of transition metal elements except Ni, Co, Mn, and Fe, X represents at least one type of element selected from the group consisting of nonmetallic elements except O and P, and $-0.4<a<1.5$, $0\le b<0.5$, $0\le c<0.5$, $-0.5<d<1.5$, and $0\le e<0.5$ are satisfied.

* * * * *